US010831481B2

(12) United States Patent
Chadha et al.

(10) Patent No.: US 10,831,481 B2
(45) Date of Patent: *Nov. 10, 2020

(54) HANDLING UNALIGNED LOAD OPERATIONS IN A MULTI-SLICE COMPUTER PROCESSOR

(71) Applicant: International Business Machines Corporation, Armonk, NY (US)

(72) Inventors: Sundeep Chadha, Austin, TX (US); Robert A. Cordes, Austin, TX (US); David A. Hrusecky, Cedar Park, TX (US); Hung Q. Le, Austin, TX (US); Jentje Leenstra, Bondorf (DE); Dung Q. Nguyen, Austin, TX (US); Brian W. Thompto, Austin, TX (US); Albert J. Van Norstrand, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/433,227

(22) Filed: Jun. 6, 2019

(65) Prior Publication Data

US 2019/0286446 A1 Sep. 19, 2019

Related U.S. Application Data

(63) Continuation of application No. 16/014,576, filed on Jun. 21, 2018, now Pat. No. 10,409,598, which is a (Continued)

(51) Int. Cl.
*G06F 12/0842* (2016.01)
*G06F 9/30* (2018.01)
(Continued)

(52) U.S. Cl.
CPC ...... *G06F 9/30047* (2013.01); *G06F 9/30043* (2013.01); *G06F 9/3891* (2013.01); (Continued)

(58) Field of Classification Search
CPC .............. G06F 9/3891; G06F 9/30043; G06F 2212/452; G06F 12/0875; G06F 12/0862; (Continued)

(56) References Cited

U.S. PATENT DOCUMENTS 5,961,628 A 10/1999 Nguyen et al.
6,044,448 A 3/2000 Agrawal et al.
(Continued)

OTHER PUBLICATIONS

ROC920150342US05, Appendix P; List of IBM Patent or Applications Treated as Related, Nov. 26, 2019, 2 pages.
(Continued)

*Primary Examiner* — Hashem Farrokh
(74) *Attorney, Agent, or Firm* — Nathan Rau

(57) ABSTRACT

Handling unaligned load operations, including: receiving a request to load data stored within a range of addresses; determining that the range of addresses includes addresses associated with a plurality of caches, wherein each of the plurality of caches are associated with a distinct processor slice; issuing, to each distinct processor slice, a request to load data stored within a cache associated with the distinct processor slice, wherein the request to load data stored within the cache associated with the distinct processor slice includes a portion of the range of addresses; executing, by each distinct processor slice, the request to load data stored within the cache associated with the distinct processor slice; and receiving, over a plurality of data communications busses, execution results from each distinct processor slice, wherein each data communications busses is associated with one of the distinct processor slices.

14 Claims, 8 Drawing Sheets

Related U.S. Application Data continuation of application No. 15/047,023, filed on Feb. 18, 2016, now Pat. No. 10,073,697, which is a continuation of application No. 14/966,075, filed on Dec. 11, 2015, now Pat. No. 10,067,763.

(51) Int. Cl.

| | | |
|---|---|---|
| *G06F 12/0813* | (2016.01) | |
| *G06F 12/0875* | (2016.01) | |
| *G06F 12/0862* | (2016.01) | |
| *G06F 9/38* | (2018.01) | |
| *G06F 13/16* | (2006.01) | |
| *G06F 13/42* | (2006.01) | |

(52) U.S. Cl.
CPC ...... *G06F 12/0813* (2013.01); *G06F 12/0842* (2013.01); *G06F 12/0862* (2013.01); *G06F 12/0875* (2013.01); *G06F 13/1668* (2013.01); *G06F 13/4282* (2013.01); *G06F 2212/283* (2013.01); *G06F 2212/452* (2013.01); *G06F 2212/602* (2013.01); *G06F 2212/62* (2013.01); *G06F 2213/0042* (2013.01)

(58) Field of Classification Search
CPC ............. G06F 13/4282; G06F 12/0842; G06F 2212/602; G06F 9/30047; G06F 12/0813; G06F 13/1668; G06F 2212/283; G06F 2212/62; G06F 2213/0042
USPC ........................................................ 711/119
See application file for complete search history.

(56) References Cited

U.S. PATENT DOCUMENTS

| | | |
|---|---|---|
| 2005/0223178 A1 | 10/2005 | Garcia et al. |
| 2007/0027870 A1* | 2/2007 | Kim .................... G06F 9/52 |
| 2010/0023524 A1 | 1/2010 | Gladwin et al. |
| 2013/0024648 A1 | 1/2013 | Chen et al. |
| 2014/0006715 A1 | 1/2014 | Saraf et al. |
| 2015/0193158 A1 | 7/2015 | Yoon et al. |
| 2016/0170886 A1* | 6/2016 | Ma .................. G06F 12/0811 |
| | | 711/122 |
| 2016/0342514 A1 | 11/2016 | Wang et al. |
| 2016/0378663 A1 | 12/2016 | Bradbury et al. |
| 2017/0168823 A1 | 6/2017 | Chadha et al. |
| 2017/0168945 A1 | 6/2017 | Chadha et al. |
| 2018/0300135 A1 | 10/2018 | Chadha et al. |
| 2018/0300136 A1 | 10/2018 | Chadha et al. |

OTHER PUBLICATIONS

U.S. Appl. No. 16/552,665, to Chadha et al., entitled, *Handling Unaligned Load Operations in a Multi-Slice Computer Processor*, assigned to International Business Machines Corporation, 48 pages, filed Aug. 27, 2019.

IBM et al., *Time Sliced Microprogrammable I/O Controller*, An IP.com Prior Art Database Technical Disclosure (online), Feb. 1, 1975, 4 Pages, URL: http://ip.com/IPCOM/000082754.

IBM et al., *Multi-Microprocessor Data Delivery System*, An IP.com Prior Art Database Technical Disclosure (online), Sep. 1, 1985, 3 Pages, URL: http://ip.com/IPCOM/000064814.

ROC920150342U505, Appendix P; List of IBM Patents or Applications Treated as Related, May 31, 2019, 2 pages.

* cited by examiner

HANDLING UNALIGNED LOAD OPERATIONS IN A MULTI-SLICE COMPUTER PROCESSOR

CROSS-REFERENCE TO RELATED APPLICATIONS

This application is a continuation application of and claims priority from U.S. patent application Ser. No. 16/014,576, filed on Jun. 21, 2018, which is a continuation application of and claims priority from U.S. patent application Ser. No. 15/047,023, filed on Feb. 18, 2016, and U.S. Pat. No. 10,067,763, issued on Sep. 4, 2018.

BACKGROUND

Field of the Invention

The field of the invention is data processing, or, more specifically, methods, apparatus, and products for handling unaligned load operations in a multi-slice computer processor.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, computer processors, and systems for handling unaligned load operations, including: receiving a request to load data stored within a range of addresses; determining that the range of addresses includes addresses associated with a plurality of caches, wherein each of the plurality of caches are associated with a distinct processor slice; issuing, to each distinct processor slice, a request to load data stored within a cache associated with the distinct processor slice, wherein the request to load data stored within the cache associated with the distinct processor slice includes a portion of the range of addresses; executing, by each distinct processor slice, the request to load data stored within the cache associated with the distinct processor slice; and receiving, over a plurality of data communications busses, execution results from each distinct processor slice, wherein each data communications busses is associated with one of the distinct processor slices.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION

Figure 1:
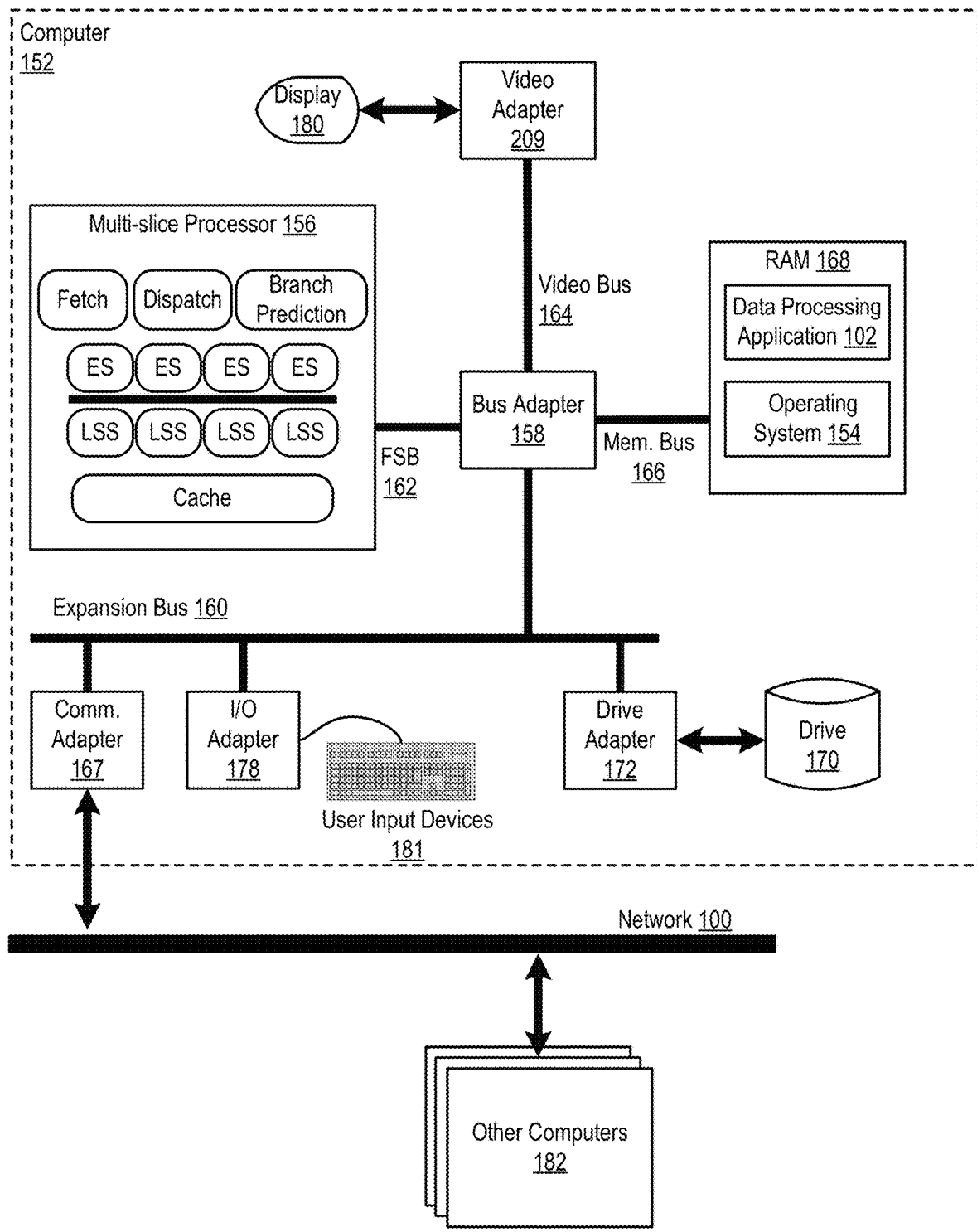
FIG. 1 sets forth a block diagram of an example system configured for handling unaligned load operations according to embodiments of the present disclosure.

Example methods, computer processors, and systems for handling unaligned load operations in accordance with the present disclosure are described with reference to the accompanying drawings, beginning with FIG. 1. FIG. 1 sets forth a block diagram of an example system configured for handling unaligned load operations according to embodiments of the present disclosure. The system of FIG. 1 includes an example of automated computing machinery in the form of a computer (152).

The computer (152) of FIG. 1 includes at least one computer processor (156) or 'CPU' as well as random access memory (168) (RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS'). Each execution slice may be configured to provide components that support execution of instructions: an issue queue, general purpose registers, a history buffer, an arithmetic logic unit (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for handling unaligned load operations according to embodiments of the present disclosure include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for handling unaligned load operations according to embodiments of the present disclosure include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for handling unaligned load operations according to embodiments of the present disclosure include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present disclosure may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present disclosure may be implemented on a variety of hardware platforms in addition to those illustrated in FIG. 1.

Figure 2:
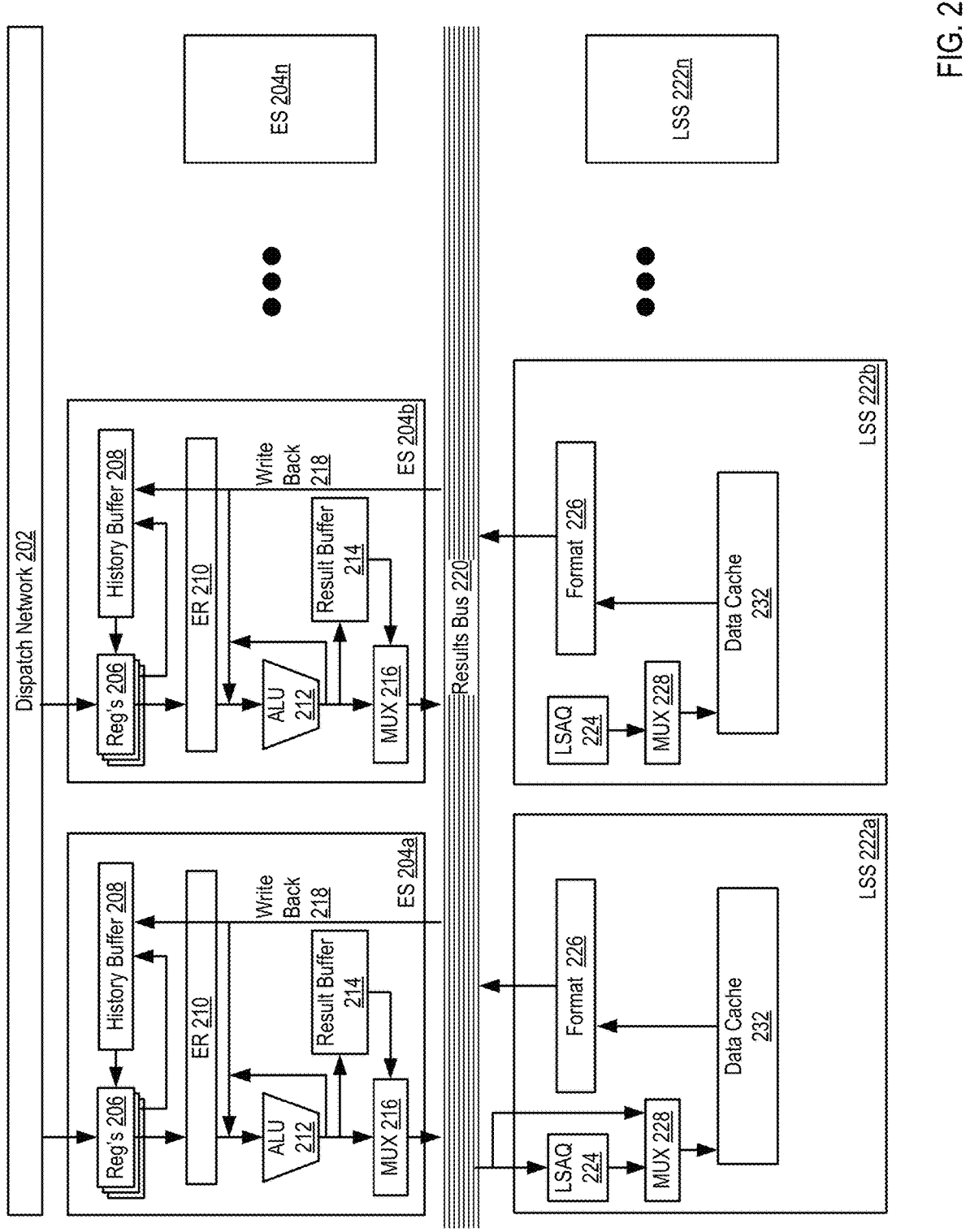
FIG. 2 sets forth a block diagram of a portion of a multi-slice processor according to embodiments of the present disclosure.

For further explanation, FIG. 2 sets forth a block diagram of a portion of a multi-slice processor according to embodiments of the present disclosure. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes general purpose registers (206) and a history buffer (208). The general purpose registers and history buffer may sometimes be referred to as the mapping facility, as the registers are utilized for register renaming and support logical registers.

The general purpose registers (206) are configured to store the youngest instruction directed to a particular logical register and the result of the execution of the instruction. A logical register is an abstraction of a physical register that enables out-of-order execution of instructions that target the same physical register.

When a younger instruction directed to the same particular logical register is received, the entry in the general purpose register is moved to the history buffer. The history buffer (208) may be configured to store many instructions directed to the same logical register. That is, the general purpose register is generally configured to store a single, youngest instruction for each logical register while the history buffer may hold many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The execution reservation station may issue the operands for execution by an arithmetic logic unit or to a load slice (222a, 222b, 222c) via the results bus (220).

The arithmetic logic unit depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus may be configured in a variety of manners and be of composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus.

The multi-slice processor in the example of FIG. 2 also includes a number of load/store slices (222a, 222b-222n). Each load/store slice includes a queue (224), a multiplexer (228), a data cache (232), and formatting logic (226). The queue receives load and store operations to be carried out by the load/store slice (222).

The multi-slice processor in the example of FIG. 2 may be configured for handling unaligned load operations according to embodiments of the present disclosure by: receiving a request to load data stored within a range of addresses; determining that the range of addresses includes addresses associated with a plurality of caches, wherein each of the plurality of caches are associated with a distinct processor slice; issuing, to each distinct processor slice, a request to load data stored within a cache associated with the distinct processor slice, wherein the request to load data stored within the cache associated with the distinct processor slice includes a portion of the range of addresses; executing, by each distinct processor slice, the request to load data stored within the cache associated with the distinct processor slice; and receiving, over a plurality of data communications busses, execution results from each distinct processor slice, wherein each data communications busses is associated with one of the distinct processor slices, as will be described in greater detail below.

In some embodiments, the multi-slice processor in the example of FIG. 2 may be further configured for handling unaligned load operations according to embodiments of the present disclosure by assembling, from the execution results from each distinct processor slice, the data stored within the range of addresses, as will be described in greater detail below. In some embodiment, assembling, from the execution results from each distinct processor slice, the data stored within the range of addresses can include: identifying a portion of each execution result that includes data stored within the range of addresses; and combining the portion of each execution result that includes data stored within the range into a single result, as will be described in greater detail below.

In some embodiments, the multi-slice processor in the example of FIG. 2 may be further configured for handling unaligned load operations according to embodiments of the present disclosure by formatting, by each processor slice, the execution results, as will be described in greater detail below. In some embodiments, formatting, by each processor slice, the execution results can include: identifying a portion of the execution results that includes data contained in the range of addresses; determining whether the portion of the execution results that includes data contained in the range of addresses represents a beginning portion of the range of addresses or an ending portion of the range of addresses; and shifting, in dependence upon whether the portion of the execution results that includes data contained in the range of addresses represents a beginning portion of the range of addresses or an ending portion of the range of addresses, the portion of the execution results that includes data contained in the range of addresses, as will be described in greater detail below.

In some embodiments, the multi-slice processor in the example of FIG. 2 may be further configured for handling unaligned load operations according to embodiments of the present disclosure by predicting when the data stored within the range of addresses will be loaded into a target memory location, as will be described in greater detail below.

In some embodiments, the multi-slice processor in the example of FIG. 2 may be further configured for handling unaligned load operations according to embodiments of the present disclosure by: identifying one or more operations that are dependent upon completion of the request to load data stored within the range of addresses; and issuing, in dependence upon when the data stored within the range of addresses is predicted to be loaded into the target memory location, the one or more operations that are dependent upon completion of the request to load data stored within the range of addresses, as will be described in greater detail below.

Figure 3:
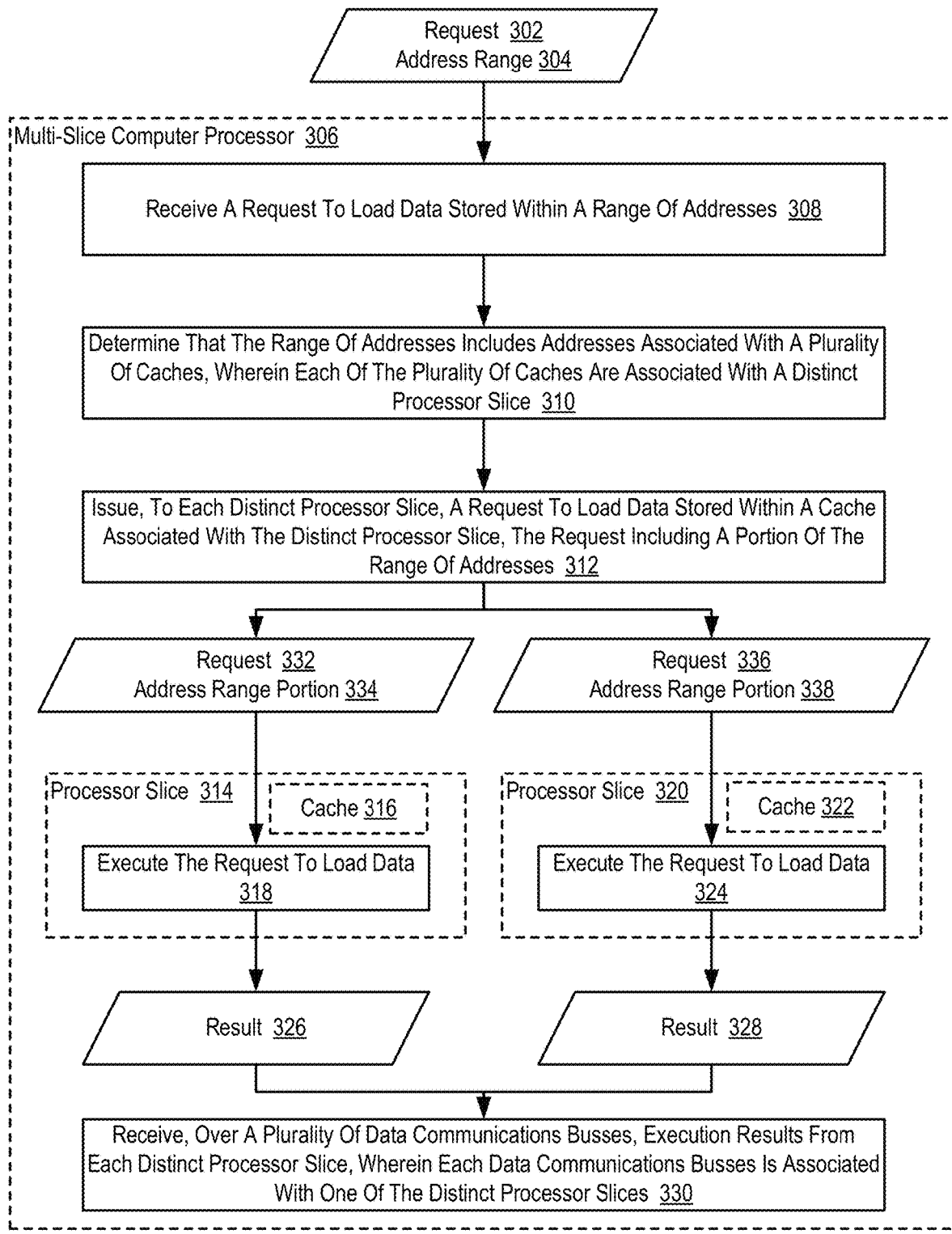
FIG. 3 sets forth a flow chart illustrating an example method for handling unaligned load operations in a multi-slice computer processor according to embodiments of the present disclosure.

For further explanation, FIG. 3 sets forth a flow chart illustrating an example method for handling unaligned load operations in a multi-slice computer processor (306) according to embodiments of the present disclosure. The multi-slice computer processor (306) of FIG. 3 may be similar to the multi-slice computer processors described above with reference to FIG. 1 and FIG. 2. Although the multi-slice computer processor (306) depicted in FIG. 3 includes only two processor slices (314, 320), readers will appreciate that the multi-slice computer processor (306) may include additional processor slices. Readers will further appreciate that while the multi-slice computer processors described above with reference to FIG. 1 and FIG. 2 refer to load/store slices and execution slices, the processor slices (314, 320) may be embodied as load/store slices, execution slices, or a combination of a load/store slice and an execution slice.

The example method depicted in FIG. 3 includes receiving (308) a request (302) to load data stored within a range (304) of addresses. The request (302) to load data stored within a range (304) of addresses may be embodied, for example, as a load operation that is fetched by the multi-slice computer processor (306) from main memory such as RAM, decoded, and placed in an issue queue. The request (302) to load data stored within a range (304) of addresses may include one or more parameters that identify, for example, a target register where the data is to be loaded into, the address range (304) where the data that is to be loaded into the target register currently resides, and so on. In such an example, the range (304) of addresses may be expressed as a beginning and ending address, as a beginning address and a size value that identifies the size of data to be read following the beginning address, and so on.

The example method depicted in FIG. 3 also includes determining (310) that the range (304) of addresses includes addresses associated with a plurality of caches (316, 322), where each of the plurality of caches (316, 322) are associated with a distinct processor slice (314, 320). Each of the plurality of caches (316, 322) may be embodied as relatively small, fast memory that are used to stores copies of the data from frequently used main memory locations. The plurality of caches (316, 322) may collectively form a single, logical cache that may be accessed using a range of memory addresses where some addresses in the range of memory addresses refer to physical memory in the first processor slice (314) and other addresses in the range of memory addresses refer to physical memory in the second processor slice (320).

Consider an example in which each cache (316, 322) includes a plurality of cache lines that are each eight bytes in size. In such an example, the first cache line in the first cache (316) may be referenced by addresses 0-7, the first cache line in the second cache (322) may be referenced by addresses 8-15, the second cache line in the first cache (316) may be referenced by addresses 16-23, the second cache line in the second cache (322) may be referenced by addresses 24-31, and so on. In such a way, a user of the multi-slice processor may view the collection of caches (316, 322) as a single cache, and may address accesses to the single cache using a contiguous range of addresses, with no need to understand the arrangement of the underlying physical memory within the individual processor slices (314, 320).

In the example method depicted in FIG. 3, determining (310) that the range (304) of addresses includes addresses associated with a plurality of caches (316, 322) may be carried out, for example, by logic that is configured to dispatch instructions to one or more processor slices (314, 320). Such logic may be configured to determine whether the range (304) of addresses spans the boundaries of addresses supported by a single cache (316, 322). Continuing with the example described above in which each cache (316, 322) includes a plurality of cache lines that are each eight bytes in size, the first cache line in the first cache (316) is referenced by addresses 0-7, and the first cache line in the second cache (322) is referenced by addresses 8-15, assume that the range (304) of addresses included in the request (302) are addresses 5-12. In such an example, a portion of such a range (304) of addresses references the first cache line in the first cache (316) while another portion of such a range (304) of addresses references the first cache line in the second cache (322). A request (302) to load data that is stored within such a range (304) of addresses that spans multiple processor slices (314, 320) is referred to herein as being an 'unaligned' request (302) to load data. In such an example, the multi-slice computer processor (306) would affirmatively determine (310) that the range (304) of addresses does include addresses associated with two caches (316, 322), each of which are associated with distinct processor slices (314, 320).

The example method depicted in FIG. 3 also includes issuing (312), to each distinct processor slice (314, 320), a request (332, 336) to load data stored within a cache (316, 322) associated with the distinct processor slice (314, 320). The request (332, 336) to load data stored within a cache (316, 322) associated with the distinct processor slice (314, 320) may include, for example, a range of addresses that align with a single cache line within the cache (316, 322) of a particular processor slice (314, 320). If the first cache line in the first cache (316) is referenced by addresses 0-7, for example, the request (332) to load data that is issued (312) to the first processor slice (314) may include an address range of 0-7. Such a request (332) may therefore represent a request to load data contained in a cache line that includes at least a portion of the range (304) of addresses specified in the original request (302) to load data.

In the example method depicted in FIG. 3, each request (332, 336) to load data stored within a cache (316, 322) that is associated with the distinct processor slice (314, 320) can include a portion (334, 338) of the range (304) of addresses. Continuing with the example described above in which each cache (316, 322) includes a plurality of cache lines that are each eight bytes in size, the first cache line in the first cache (316) is referenced by addresses 0-7, the first cache line in the second cache (322) is referenced by addresses 7-15, and the range (304) of addresses included in the request (302) are addresses 5-12, a first request (332) may be issued (312) to the first processor slice (314) and a second request (332) may be issued (312) to the second processor slice (320). For ease of explanation, assume that the multi-slice computer processor (306) only supports fixed-size load operations, such that requests to load data always retrieve eight bytes of data. In such an example, the first request (332) that is issued (312) to the first processor slice (314) can specify that the load operation is to retrieve data stored at addresses 0-7, such that the first request (332) that is issued (312) to the first processor slice (314) includes a first portion (334) of the range (304) of addresses. More specifically, the first request (332) that is issued (312) to the first processor slice (314) includes addresses 5-7 from the range (304) of addresses. In such an example, the second request (336) that is issued (312) to the second processor slice (320) can specify that the load operation is to retrieve data stored at addresses 8-15, such that the second request (336) that is issued (312) to the second processor slice (320) includes a second portion (338) of the range (304) of addresses. More specifically, the second request (336) that is issued (312) to the second processor slice (320) includes addresses 8-12 from the range (304) of addresses.

The requests (332, 336) depicted in FIG. 3 may further include control information that identifies which portion of the data contained within the cache (316) represents data stored within the range (304) of addresses that is specified in the original request (302) to load data. For example, the request (332) that is issued (312) to the first processor slice (314) may include control information that identifies address 5-7 within the cache (316) as containing data stored within the range (304) of addresses that is specified in the original request (302) to load data. Likewise, the request (336) that is issued (312) to the second processor slice (320) may include control information that identifies address 8-12 within the cache (322) as containing data stored within the range (304) of addresses that is specified in the original request (302) to load data.

In the example method depicted in FIG. 3, issuing (312) the request (332, 336) to load data stored within a cache (316, 322) associated with the distinct processor slice (314, 320) to each distinct processor slice (314, 320) may be carried out by sending the request (332, 336) to the appropriate processor slice (314, 320) via a dispatch network. Such a request (332, 336) may ultimately be placed in an execution reservation station of the appropriate processor slice (314, 320) for subsequent execution by the appropriate processor slice (314, 320).

The example method depicted in FIG. 3 also includes executing (318, 324), by each distinct processor slice (314, 320), the request (332, 336) to load data. Executing (318, 324) the request (332, 336) to load data may be carried out, for example, by retrieving data stored at an address range specified in the request (332, 336) and storing such data in a register or other destination address identified in the request (332, 336). Readers will appreciate that in the example method depicted in FIG. 3, each processor slice (314, 320) acts independently of the other processor slices (314, 320) in the sense that there is no attempt made to coordinate the execution (318, 324) of the requests (332, 336) between the processor slices (314, 320). As such, one processor slice (314) may execute (318) the request (332) that it received at a different point in time than when the other processor slice (320) executes (324) the request (336) that it received. In the example method depicted in FIG. 3, the request (332, 336) to load data may be executed (318, 324) by a load/store slice that is part of the processor slice (314, 320).

The example method depicted in FIG. 3 also includes receiving (330), over a plurality of data communications busses, execution results (326, 328) from each distinct processor slice (314, 320). The data communications busses may be embodied as individual busses within a collection of busses that are similar to the results bus described above with reference to FIG. 1 and FIG. 2. Each of the data communications busses may be associated with one of the distinct processor slices (314, 320) in the sense that each processor slice (314, 320) may be configured to broadcast any results that the processor slice (314, 320) generates by executing an instruction on a particular bus. For example, a first processor slice (314) may be configured to utilize a first bus to broadcast results that the first processor slice (314) generates by executing an instruction, a second processor slice (320) may be configured to utilize a second bus to broadcast results that the second processor slice (320) generates by executing an instruction, and so on. In the example method depicted in FIG. 3, execution results (326, 328) that are generated by each processor slice (314, 320) in response to each processor slice (314, 320) executing (318, 324) their respectively received requests (332, 336) to load data may be placed on the predetermined bus that is associated with each processor slice (314, 320). Continuing with the example described above, the first processor slice (314) may utilize the first bus to broadcast the execution results (326) generated by the first processor slice (314) executing (318) the request (332) to load data that was received by the first processor slice (314) and the second processor slice (320) may utilize the second bus to broadcast the execution results (328) generated by the second processor slice (320) executing (324) the request (336) to load data that was received by the second processor slice (320). In such a way, any entity that listens to the plurality of data communications busses may receive (330) execution results (326, 328) from each distinct processor slice (314, 320) over the plurality of data communications busses.

Figure 4:
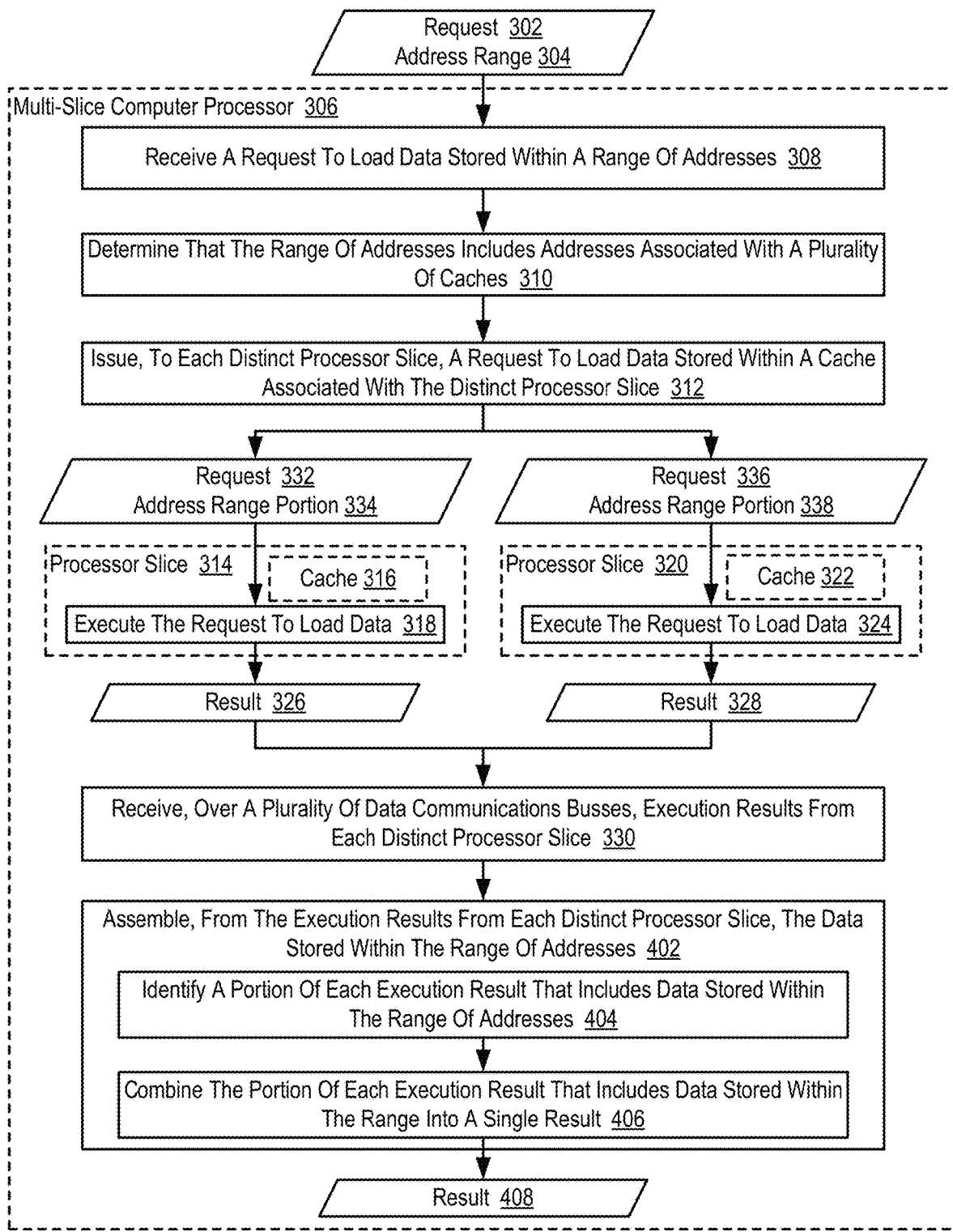
FIG. 4 sets forth a flow chart illustrating an additional example method for handling unaligned load operations in a multi-slice computer processor according to embodiments of the present disclosure.

For further explanation, FIG. 4 sets forth a flow chart illustrating an additional example method for handling unaligned load operations in a multi-slice computer processor (306) according to embodiments of the present disclosure. The example method depicted in FIG. 4 is similar to the example method depicted in FIG. 3, as the example method depicted in FIG. 4 also includes receiving (308) a request (302) to load data stored within a range (304) of addresses, determining (310) that the range (304) of addresses includes addresses associated with a plurality of caches (316, 322), where each of the plurality of caches (316, 322) are associated with a distinct processor slice (314, 320), issuing (312) a request (332, 336) to load data stored within a cache (316, 322) associated with the distinct processor slice (314, 320), executing (318, 324) the request (332, 336) to load data, and receiving (330) execution results (326, 328) from each distinct processor slice (314, 320).

The example method depicted in FIG. 4 also includes assembling (402), from the execution results (326, 328) from each distinct processor slice (314, 320), the data stored within the range (304) of addresses. Assembling (402) the data stored within the range (304) of addresses may be carried out, for example, by first identifying (404) the portion of each execution result (326, 328) that includes data stored within the range (304) of addresses. Once the portion of each execution result (326, 328) that includes data stored within the range (304) of addresses has been identified (404), the multi-slice computer processor (306) may combine (406) the portion of each execution result (326, 328) that includes data stored within the range (304) into a single result (408).

Figure 5:
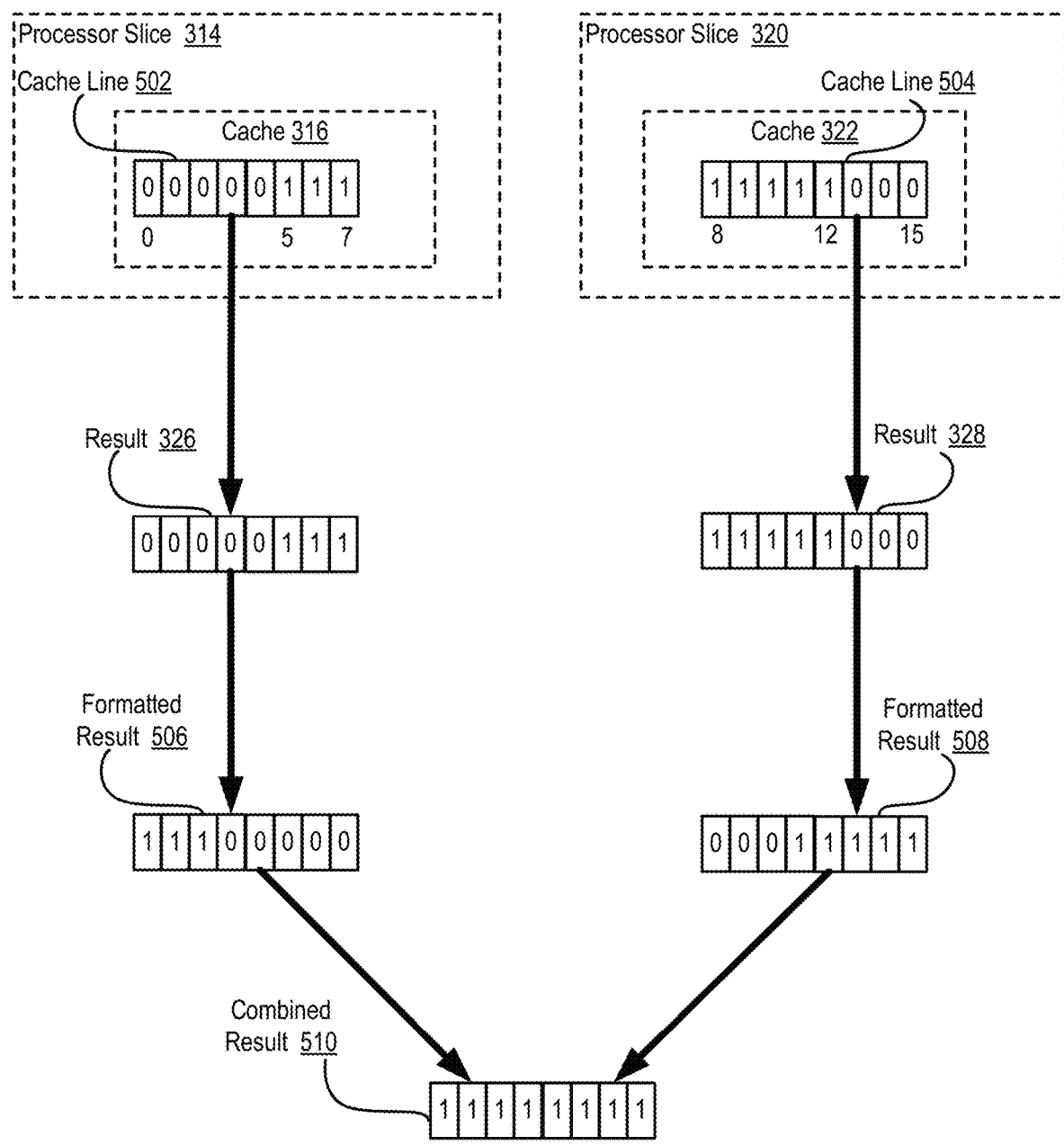
FIG. 5 sets forth a diagram illustrating an example in which execution results are received from distinct processor slices and the data stored within the range of addresses is assembled from the execution results received from each distinct processor slice according to embodiments of the present disclosure.

For further explanation, FIG. 5 sets forth a diagram illustrating an example of receiving execution results from distinct processor slices and assembling the data stored within the range of addresses from the execution results received from each distinct processor slice according to embodiments of the present disclosure. The example depicted in FIG. 5 is a continuation of the example described above where cache (316, 322) includes cache lines (502, 504) that are each eight bytes in size. For ease of explanation, each cache (316, 322) is depicted as including only a single cache line (502, 504), although readers will appreciate that each cache (316, 322) may include many additional cache lines.

In the example depicted in FIG. 5, the first cache line (502) in the first cache (316) is referenced by addresses 0-7 and the first cache line (504) in the second cache (322) is referenced by addresses 8-15. Assume in this example, that the range of addresses included in the request to load data are addresses 5-12. In such an example, a first request may be issued to the first processor slice (314) and a second request may be issued to the second processor slice (320), where the first request that is issued to the first processor slice (314) specifies that the load operation is to retrieve data stored at addresses 0-7 and the second request that is issued to the second processor slice (320) specifies that the load operation is to retrieve data stored at addresses 8-15. In such an example, the eight byte result (326) returned by the first processor slice (314) may include five bytes that are not included in the range (304 of FIG. 4) of addresses and three bytes that is included in the range (304 of FIG. 4) of addresses. Likewise, in such an example, the eight byte result (328) returned by the second processor slice (320) may include five bytes are included in the range (304 of FIG. 4) of addresses and three bytes that are not included in the range (304 of FIG. 4) of addresses.

In the example method depicted in FIG. 5, the result (326) returned by the first processor slice (314) and the result (328) returned by the second processor slice (320) may be formatted prior to being assembled. For the result (326) returned by the first processor slice (314), the five bytes that are not included in the range (304 of FIG. 4) of addresses may be removed, the three bytes that is included in the range (304 of FIG. 4) of addresses may be shifted left, and the remaining bytes of the formatted result (506) may be populated with values of 0. For the result (328) returned by the second processor slice (320), the three bytes that is not included in the range (304 of FIG. 4) of addresses may be removed, the five bytes that are included in the range (304 of FIG. 4) of addresses may be shifted right, and the remaining bytes of the formatted result (506) may be populated with values of 0.

Readers will appreciate that the decision regarding which bytes to remove from a particular result and which direction to shift the remaining bytes may be facilitated through the use of control information that is included in the request that is issued to each processor slice. Such control information may include, for example, an identification of a point within the result that divides bytes that are not included in the range (304 of FIG. 4) of addresses from bytes that are included in the range (304 of FIG. 4) of addresses, information describing whether the bytes that are not included in the range (304 of FIG. 4) of addresses are on the right side or left side of the dividing point, information describing whether the bytes that are included in the range (304 of FIG. 4) of addresses are on the right side or left side of the dividing point, and so on. For example, the request (332 in FIG. 4) that was issued to the first processor slice (314) may include information indicating that the point within the result (326) that divides bytes that are not included in the range (304 of FIG. 4) of addresses from bytes that are included in the range (304 of FIG. 4) of addresses is the between the fifth and sixth byte, as well as information indicating that the bytes to the right of the dividing point are included in the range (304 of FIG. 4) of addresses. The request (336 in FIG. 4) that was issued to the second processor slice (320) may include information indicating that the point within the result (328) that divides bytes that are not included in the range (304 of FIG. 4) of addresses from bytes that are included in the range (304 of FIG. 4) of addresses is between the fifth and sixth byte, as well as information indicating that the bytes to the left of the dividing point are included in the range (304 of FIG. 4) of addresses. In such an example, the multi-slice processor may be configured to format results by shifting bytes that are included in the range (304 of FIG. 4) of addresses left when such bytes are after the dividing point, and the multi-slice processor may be further configured to format results by shifting bytes that are included in the range (304 of FIG. 4) of addresses right when such bytes are before the dividing point.

In the example depicted in FIG. 5, a single combined result (510) may be assembled, for example, by performing a logical OR using the formatted results (506, 508) as input parameters. Readers will appreciate that the combined result (510) represents the data that is stored within the range (304 of FIG. 4) of addresses that were originally received in the request (302 of FIG. 4) to load data. In the specific example depicted in FIG. 5, the combined result (510) is identical to the contents of addresses 5-12, which were identified as the range of addresses included in the example request to load data.

Figure 6:
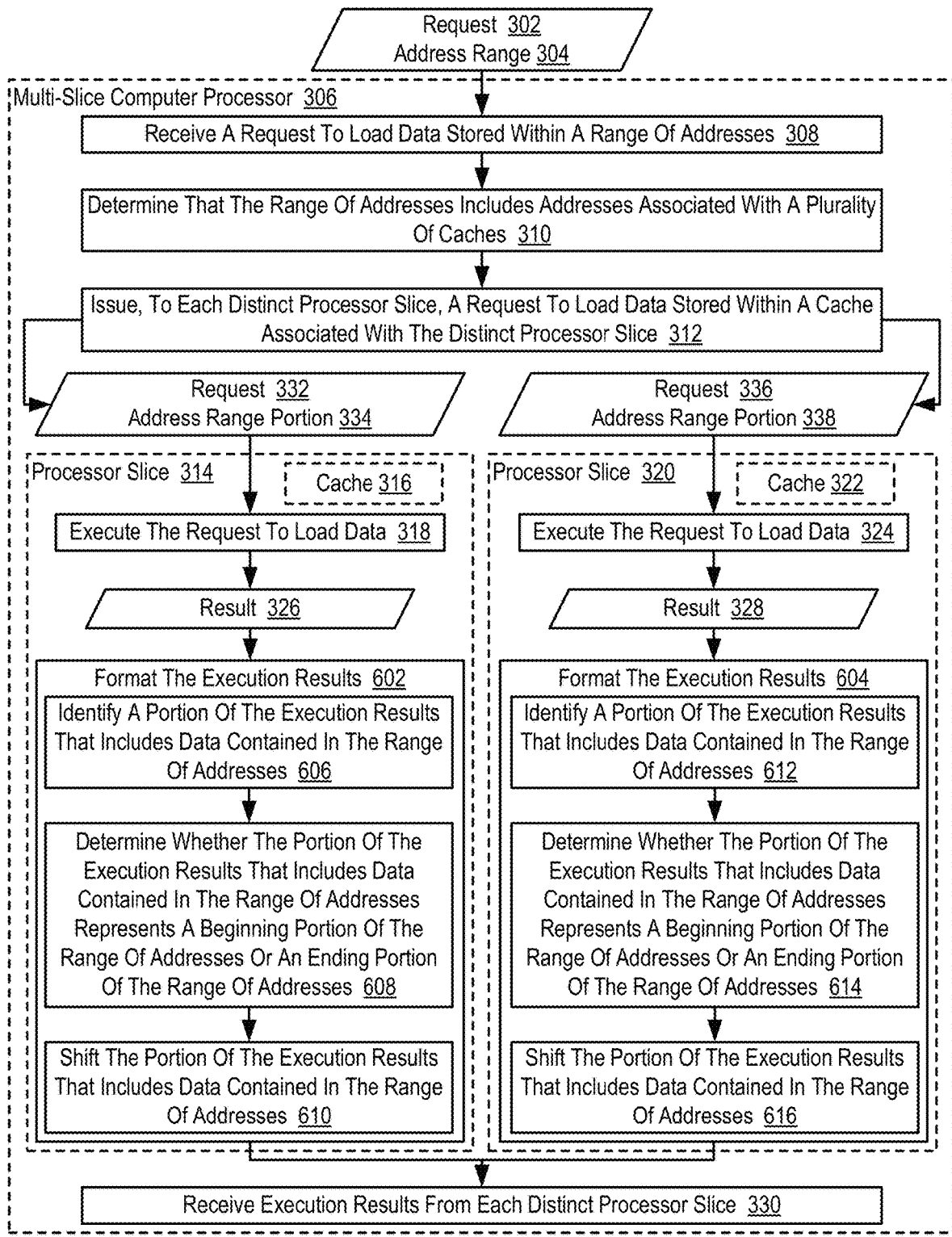
FIG. 6 sets forth a flow chart illustrating an additional example method for handling unaligned load operations in a multi-slice computer processor according to embodiments of the present disclosure.

For further explanation, FIG. 6 sets forth a flow chart illustrating an additional example method for handling unaligned load operations in a multi-slice computer processor (306) according to embodiments of the present disclosure. The example method depicted in FIG. 6 is similar to the example method depicted in FIG. 3, as the example method depicted in FIG. 6 also includes receiving (308) a request (302) to load data stored within a range (304) of addresses, determining (310) that the range (304) of addresses includes addresses associated with a plurality of caches (316, 322), where each of the plurality of caches (316, 322) are associated with a distinct processor slice (314, 320), issuing (312) a request (332, 336) to load data stored within a cache (316, 322) associated with the distinct processor slice (314, 320), executing (318, 324) the request (332, 336) to load data, and receiving (330) execution results (326, 328) from each distinct processor slice (314, 320).

The example method depicted in FIG. 6 also includes formatting (602, 604), by each processor slice (314, 320), the execution results (326, 328). In the example method depicted in FIG. 6, formatting (602, 604) the execution results (326, 328) generated by processor slice (314, 320) executing the request (332, 336) to load data may be carried out, for example, by removing the portion of the execution results (326, 328) that are not included in the range (304) of addresses specified in the original request (302) to load data, by shifting the portion of the execution results (326, 328) that are included in the range (304) of addresses specified in the original request (302) to load data, by filling a portion of the execution results (326, 328) that are not included in the range (304) of addresses specified in the original request (302) to load data with a predetermined value, and so on. Readers will appreciate that an example of formatting (602, 604) the execution results (326, 328) is described above with reference to FIG. 5, as the execution results are transformed into formatted results.

In the example method depicted in FIG. 6, formatting (602, 604) the execution results (326, 328) can include identifying (606, 612) a portion of the execution results (326, 328) that includes data contained in the range (304) of addresses. Identifying (606, 612) a portion of the execution results (326, 328) that includes data contained in the range (304) of addresses may be carried out, for example, through the use of control information that is included in the request (332, 336) to load data that is issued to each individual processor slice (314, 320). As described above, such control information may identify a dividing point within the execution result (326, 328) that will separate data contained in the range (304) of addresses from data that is not contained in the range (304) of addresses. The control information may also include an identifier such as, for example, a single bit that is used to specify whether the data contained in the addresses that are lower than the dividing point or the addresses that are higher than the dividing point include data contained in the range (304) of addresses. For example, a value of 0 may indicate that the data contained in the addresses that are lower than the dividing point include data contained in the range (304) of addresses while a value of 1 may indicate that the data contained in the addresses that are higher than the dividing point include data contained in the range (304) of addresses. In alternative embodiments, such control information may include the range of addresses within the execution results (328, 328) that include data contained in the range (304) of addresses identified in the original request (302) to load data, the range of addresses within the execution results (328, 328) that do not include data contained in the range (304) of addresses identified in the original request (302) to load data, and other information useful in identifying the portions of the execution results (326, 328) that include data contained in the range (304) of addresses identified in the original request (302) to load data.

In the example method depicted in FIG. 6, formatting (602, 604) the execution results (326, 328) can also include determining (608, 614) whether the portion of the execution results (326, 328) that includes data contained in the range (304) of addresses represents a beginning portion of the range (304) of addresses or an ending portion of the range (304) of addresses. Determining (608, 614) whether the portion of the execution results (326, 328) that includes data contained in the range (304) of addresses represents a beginning portion of the range (304) of addresses or an ending portion of the range (304) of addresses may be carried out, for example, through the use of control information that is included in the request (332, 336) to load data that is issued to each individual processor slice (314, 320). As described above, such control information may identify a dividing point within the execution result (326, 328) that will separate data contained in the range (304) of addresses from data that is not contained in the range (304) of addresses. The control information may also include an identifier such as, for example, a single bit that is used to specify whether the data contained in the addresses that are lower than the dividing point or the addresses that are higher than the dividing point include data contained in the range (304) of addresses. For example, a value of 0 may indicate that the data contained in the addresses that are lower than the dividing point include data contained in the range (304) of addresses while a value of 1 may indicate that the data contained in the addresses that are higher than the dividing point include data contained in the range (304) of addresses. As such, determining (608, 614) whether the portion of the execution results (326, 328) that includes data contained in the range (304) of addresses represents a beginning portion of the range (304) of addresses or an ending portion of the range (304) of addresses may be carried out by examining such control information.

In the example method depicted in FIG. 6, formatting (602, 604) the execution results (326, 328) can also include shifting (610, 616), in dependence upon whether the portion of the execution results (326, 328) that includes data contained in the range (304) of addresses represents a beginning portion of the range (304) of addresses or an ending portion of the range (304) of addresses, the portion of the execution results that includes data contained in the range (304) of addresses. Shifting (610, 616) the portion of the execution results that includes data contained in the range (304) of addresses in dependence upon whether the portion of the execution results (326, 328) that includes data contained in the range (304) of addresses represents a beginning portion of the range (304) of addresses or an ending portion of the range (304) of addresses may be carried out, for example, by applying shifting rules that specify which direction data should be shifted. Such shifting rules may specify, for example, that when the portion of the execution results (326, 328) that includes data contained in the range (304) of addresses represents a beginning portion of the range (304) of addresses, the portion of the execution results (326, 328) that includes data contained in the range (304) of addresses should be shifted left. Likewise, such shifting rules may specify that when the portion of the execution results (326, 328) that includes data contained in the range (304) of addresses represents an ending portion of the range (304) of addresses, the portion of the execution results (326, 328) that includes data contained in the range (304) of addresses should be shifted right. Readers will appreciate that an example of shifting (610, 616) is described above with reference to FIG. 5, as the execution results are transformed into formatted results.

Readers will further appreciate that shifting rules may take into account other information. For example, the shifting rules may take into account the endianness of data, such that the portion of the execution results (326, 328) that includes data contained in the range (304) of addresses will be shifted in one direction when data is in big endian format versus little endian format, even when such data represents the same portion (ending or beginning) of the range (304) of addresses identified in the original request (302) to load data.

Figure 7:
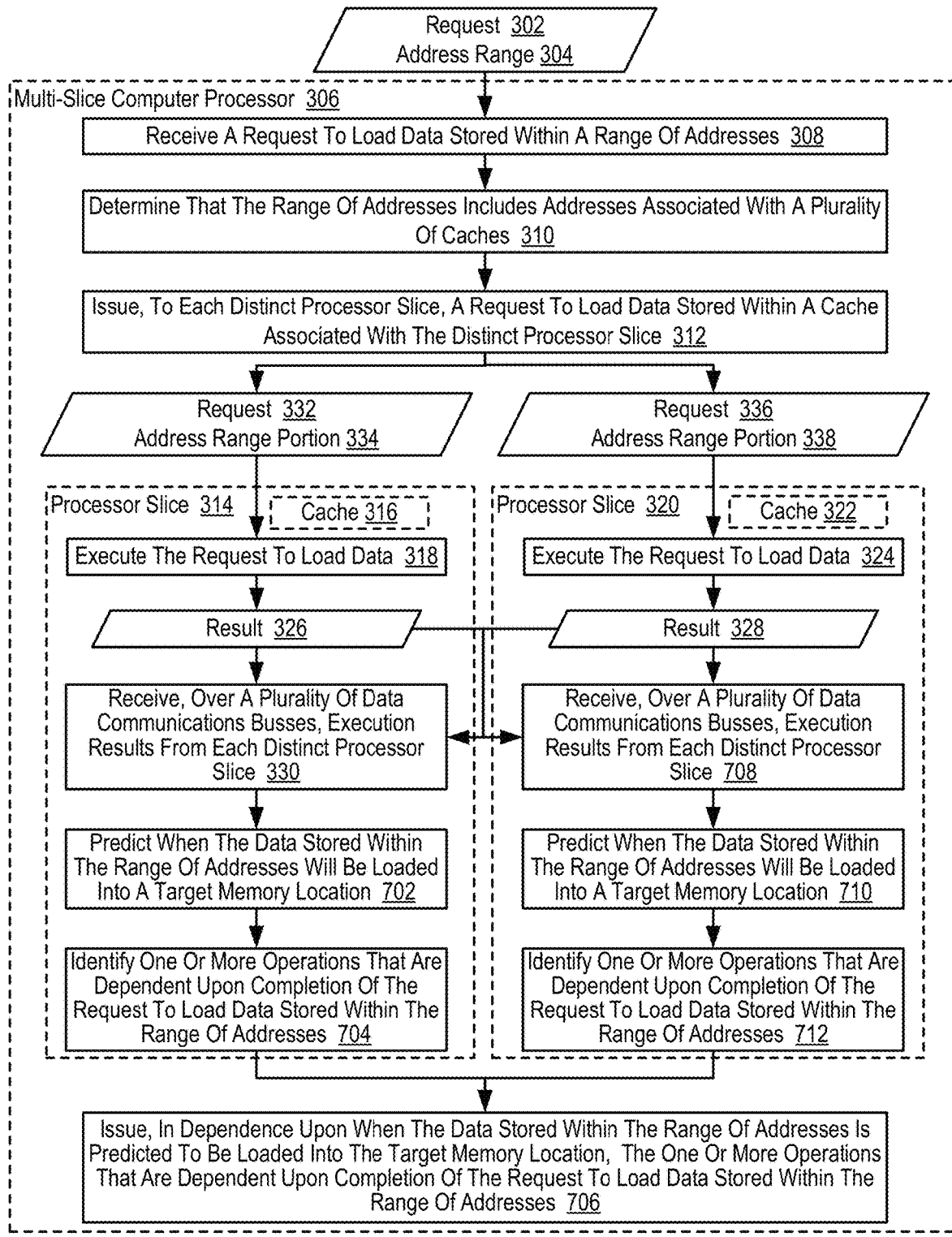
FIG. 7 sets forth a flow chart illustrating an additional example method for handling unaligned load operations in a multi-slice computer processor according to embodiments of the present disclosure.

For further explanation, FIG. 7 sets forth a flow chart illustrating an additional example method for handling unaligned load operations in a multi-slice computer processor (306) according to embodiments of the present disclosure. The example method depicted in FIG. 7 is similar to the example method depicted in FIG. 3, as the example method depicted in FIG. 7 also includes receiving (308) a request (302) to load data stored within a range (304) of addresses, determining (310) that the range (304) of addresses includes addresses associated with a plurality of caches (316, 322), where each of the plurality of caches (316, 322) are associated with a distinct processor slice (314, 320), issuing (312) a request (332, 336) to load data stored within a cache (316, 322) associated with the distinct processor slice (314, 320), executing (318, 324) the request (332, 336) to load data, and receiving (330, 708) execution results (326, 328) from each distinct processor slice (314, 320). Readers will appreciate that in the example method depicted in FIG. 7, each of the processor slices (314, 320) can simultaneously receive (330, 708) execution results (326, 328) from each distinct processor slice (314, 320).

The example method depicted in FIG. 7 also includes predicting (702, 710) when the data stored within the range (304) of addresses will be loaded into a target memory location. The target memory location may be embodied, for example, as a register within the multi-slice computer processor (306), as one or more register within one or more processor slices (314, 320), and so on. Readers will appreciate that when the request (302) to load data stored within the range (304) of addresses is an unaligned request whose range (304) of addresses span multiple processor slices (314, 320), the data stored within the range (304) of addresses can only be loaded into the target memory location after all processor slices that contain some portion of the data have returned their individual results (326, 328). The point in time at which the data stored within the range (304) of addresses will be loaded into the target memory location is therefore a function of the point in time at which all processor slices (314, 320) that contain some portion of the data have returned their individual results (326, 328).

In the example method depicted in FIG. 7, predicting (702, 710) when the data stored within the range (304) of addresses will be loaded into a target memory location may be carried out through the use of an instruction identifier. An instruction identifier may be embodied as a unique value that identifies each instruction that is executed by the multi-slice computer processor (306). In such an example, the request (302) to load data stored within the range (304) of addresses may be identified by an instruction identifier. When the request (302) to load data stored within the range (304) of addresses is an unaligned request, causing subsequent requests (332, 336) to be issued (312) to a plurality of processor slices (314, 320), each of the subsequent requests (332, 336) may be associated with the same instruction identifier associated with the request (302) to load data stored within the range (304) of addresses.

Each request (332, 336) that is issued (312) to one of the processor slices (314, 320) may also include information identifying which processor slices (314, 320) are participating in the execution of the request (302) to load data stored within the range (304) of addresses. Readers will appreciate that the processor slices (314, 320) that are required to return some portion the data stored within the range (304) of addresses may be identified in a variety of ways. For example, a bit pattern may be associated with the original request (302) to load data that identifies each processor slice (314, 320) whose cache (316, 322) includes some portion of the range (304) of addresses identified in the request (302). Consider an example in which the multi-slice computer processor (306) includes four processor slices. In such an example, if the first and second processor slices are the only processor slices whose cache includes some portion of the range (304) of addresses identified in the request (302), a bit pattern of 1100 may be associated with the original request (302) to load data. Likewise, if the second and third processor slices are the only processor slices whose cache includes some portion of the range (304) of addresses identified in the request (302), a bit pattern of 0110 may be associated with the original request (302) to load data. In such a way, a listener of the results bus may monitor the results bus to determine which processor slices (314, 320) that include some portion of the data stored within the range (304) of addresses have returned their portions and which processor slices (314, 320) that include some portion of the data stored within the range (304) of addresses have not returned their portions.

Readers will appreciate that the bit pattern described above may be utilized by each processor slice (314, 320) to enable each processor slice (314, 320) to determine whether results have been received from each processor slice whose cache includes some portion of the range (304) of addresses identified in the original request (302) to load data. Consider an example in which the first, second, and third processor slices in a multi-slice computer processor that includes four processor slices includes some portion of the range (304) of addresses identified in the original request (302) to load data. In such an example, a bit pattern of 1110 can be associated with the original request (302) to load data. Each processor slice (314, 320) can utilize this bit pattern and subsequently monitor the portion of the results bus that is utilized by the first, second, and third processor slices. As each of the participating processor slices (i.e., the first, second, and third processor slices) place result data on the results bus that is associated with an instruction identifier that matches the instruction identifier of the original request (302) to load data, the processor slices that are monitoring the results bus may determine whether results have been received from each processor slice whose cache includes some portion of the range (304) of addresses identified in the original request (302) to load data. The processor slices that are monitoring the results bus may determine whether results have been received from each processor slice whose cache includes some portion of the range (304) of addresses identified in the original request (302) to load data, for example, by maintaining a local bit map and comparing the local bit map to the bit pattern associated with the original request (302) to load data. Once the local bit map and the bit pattern associated with the original request (302) to load data are identical, the processor slices that are monitoring the results bus may affirmatively determine that results have been received from each processor slice whose cache includes some portion of the range (304) of addresses identified in the original request (302) to load data. Readers will appreciate that such a determination may be made in other ways through the utilization of the bit pattern that is associated with the original request (302) to load data.

Upon determining that all processor slices that include some portion of the data stored within the range (304) of addresses have returned their portions, the multi-slice computer processor (306) may predict (702, 710) that the data stored within the range (304) of addresses will be loaded into a target memory location upon the expiration of the number of processor cycles that are required to load the results (326, 328) from each processor slice (314, 320) into an interim destination, assemble the results (326, 328) from each processor slice (314, 320) into a final result, and load the final result into the target location specified in the original request (302) to load data.

In the example method depicted in FIG. 7, each processor slice (314, 320) that includes some portion of the data stored within the range (304) of addresses identified in the original request (302) to load data will need to return the portion of the data stored within the range (304) of addresses identified in the original request (302) to load data that is stored within their individual caches (316, 322). Each processor slice (314, 320) may return the portion of the data stored within the range (304) of addresses identified in the original request (302) to load data that is stored within their individual caches (316, 322) via the results bus. As such, the results bus may be monitored determine which processor slices (314, 320) that include some portion of the data stored within the range (304) of addresses have returned their portions and which processor slices (314, 320) that include some portion of the data stored within the range (304) of addresses have not returned their portions.

The example method depicted in FIG. 7 also includes identifying (704, 712) one or more operations that are dependent upon the completion of the request (302) to load data stored within the range (304) of addresses. An operation may be dependent upon the completion of the request (302) to load data stored within the range (304) of addresses, for example, when the operation utilizes the data stored within the range (304) of addresses as an input. Consider an example in which the operation is an add operation that adds two values. In such an example, when one of the values to be added is a value stored data within the range (304) of addresses included in the request (302), the add operation is dependent upon the completion of the request (302) to load data stored within the range (304) of addresses.

In the example method depicted in FIG. 7, identifying (704, 712) one or more operations that are dependent upon the completion of the request (302) to load data stored within the range (304) of addresses may be carried out, for example, by identifying a target location such as a target register where the data stored within the range (304) of addresses is to be loaded. In such an example, each pending operation may be examiner to determine whether the pending operation utilizes an operand that is stored in the target register where the data stored within the range (304) of addresses is to be loaded.

The example method depicted in FIG. 7 also includes issuing (706), in dependence upon when the data stored within the range (304) of addresses is predicted to be loaded into the target memory location, the one or more operations that are dependent upon completion of the request (302) to load data stored within the range (304) of addresses. Issuing (706) the one or more operations that are dependent upon completion of the request (302) to load data stored within the range (304) of addresses in dependence upon when the data stored within the range (304) of addresses is predicted to be loaded into the target memory location may be carried out, for example, by issuing the dependent operations at a point in time where the dependent operations will attempt to read the target memory location shortly after the data stored within the range (304) of addresses is predicted to be loaded into the target memory location. In such an example, factors such as the amount of time that is required to wake up a dependent operation may be taken into consideration. Readers will appreciate that although each processor slice (314, 320) is not explicitly depicted as issuing (706) the one or more operations that are dependent upon completion of the request (302) to load data stored within the range (304) of addresses, each processor slice (314, 320) may perform this function.

Figure 8:
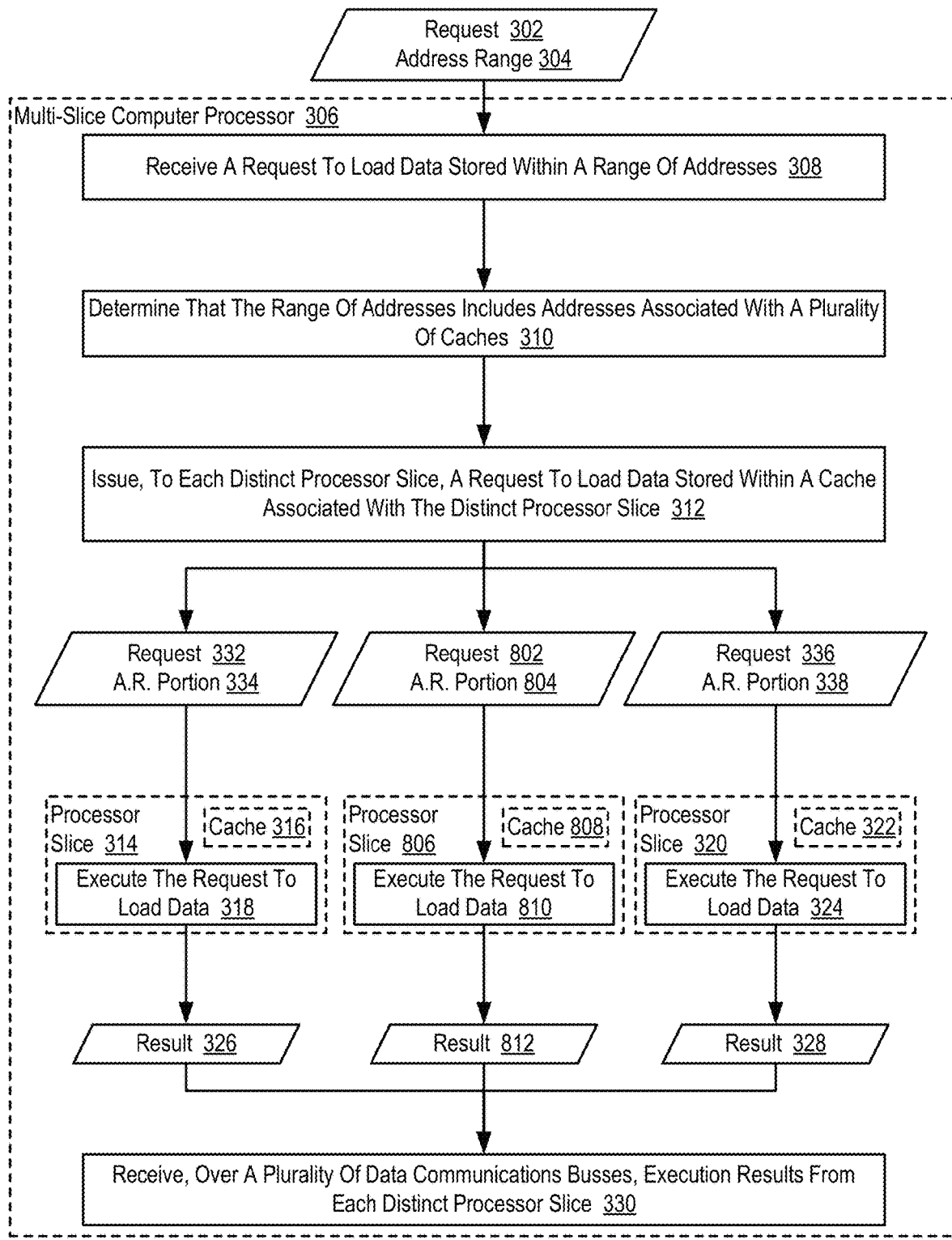
FIG. 8 sets forth a flow chart illustrating an additional example method for handling unaligned load operations in a multi-slice computer processor according to embodiments of the present disclosure.

For further explanation, FIG. 8 sets forth a flow chart illustrating an additional example method for handling unaligned load operations in a multi-slice computer processor (306) according to embodiments of the present disclosure. The example method depicted in FIG. 8 is similar to the example method depicted in FIG. 3, as the example method depicted in FIG. 8 also includes receiving (308) a request (302) to load data stored within a range (304) of addresses, determining (310) that the range (304) of addresses includes addresses associated with a plurality of caches (316, 322), where each of the plurality of caches (316, 322) are associated with a distinct processor slice (314, 320), issuing (312) a request (332, 336) to load data stored within a cache (316, 322) associated with the distinct processor slice (314, 320), executing (318, 324) the request (332, 336) to load data, and receiving (330) execution results (326, 328) from each distinct processor slice (314, 320).

The example method depicted in FIG. 8 includes an additional processor slice (806) that was not depicted in FIGS. 3-7, although the example methods depicted in FIGS. 3-7 may be carried out on a multi-slice computer processor (306) that includes more than two processor slices. In fact, embodiments of the present disclosure may be implemented on any multi-slice computer processor that includes two or more processor slices. The example method depicted in FIG. 8 illustrates an embodiment where the range (304) of addresses included in the original request (302) to load data spans more than two processor slices (314, 806, 320).

Consider an example in which each cache (316, 808, 322) includes a plurality of cache lines that are each sixteen bytes in size. In such an example, the first cache line in the first cache (316) may be referenced by addresses 0-15, the first cache line in the second cache (808) may be referenced by addresses 16-31, the first cache line in the third cache (322) may be referenced by addresses 32-47, the second cache line in the first cache (316) may be referenced by addresses 48-63, the second cache line in the second cache (808) may be referenced by addresses 64-89, the second cache line in the third cache (322) may be referenced by addresses 90-105, and so on. Assume in such an example that the request (302) to load data is a quadruple word request, where the range (304) of addresses included in the request (302) are addresses 11-58. In such an example, a portion of such a range (304) of addresses references the first cache line in the first cache (316), another portion of such a range (304) of addresses references the first cache line in the second cache (808), and another portion of such a range (304) of addresses references the first cache line in the third cache (322).

In the example described in the preceding paragraph, a first request (332) would be issued (312) to the first processor slice (314), where the first request (332) represents an instruction to load data stored in the cache (316) of the first processor slice (314) that includes at least a portion (334) of the range (304) of addresses identified in the original request (302) to load data. In the example described in the preceding paragraph, a second request (802) would be issued (312) to the second processor slice (806), where the second request (802) represents an instruction to load data stored in the cache (808) of the second processor slice (806) that includes at least a portion (804) of the range (304) of addresses identified in the original request (302) to load data. In the example described in the preceding paragraph, a third request (336) would be issued (312) to the third processor slice (320), where the third request (336) represents an instruction to load data stored in the cache (322) of the third processor slice (320) that includes at least a portion (338) of the range (304) of addresses identified in the original request (302) to load data. Upon receiving the respective requests (332, 802, 336), each processor slice (314, 806, 320) executes (318, 810, 324) the received request (332, 802, 336), thereby producing execution results (326, 812, 328). Readers will appreciate that while the execution results (326, 328) produced by the first and third processor slices (314, 320) will include some data that is included in the range (304) of addresses identified in the original request (302) to load data and some data that is not included in the range (304) of addresses identified in the original request (302) to load data, the execution result (812) produced by the second processor slice (806) will include only data that is included in the range (304) of addresses identified in the original request (302) to load data.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method of handling unaligned load operations in a multi-slice computer processor, the method comprising:
   receiving a request to load data stored within a range of addresses, wherein the range of addresses includes a plurality of addresses each referencing physical memory in one of a plurality of distinct processor slices;
   receiving, over a plurality of data communications busses, execution results from each distinct processor slice, wherein each of the plurality of data communications busses is associated with one of the distinct processor slices; and
   formatting, by each processor slice, the execution results, including:
      identifying a portion of the execution results that includes data contained in the range of addresses;
      determining whether the portion of the execution results that includes data contained in the range of addresses represents a beginning portion of the range of addresses or an ending portion of the range of addresses; and
      shifting, in dependence upon whether the portion of the execution results that includes data contained in the range of addresses represents a beginning portion of the range of addresses or an ending portion of the range of addresses, the portion of the execution results that includes data contained in the range of addresses.

2. The method of claim 1 further comprising assembling, from the execution results from each distinct processor slice, the data stored within the range of addresses.

3. The method of claim 2 wherein assembling, from the execution results from each distinct processor slice, the data stored within the range of addresses further comprises:
   identifying a portion of each execution result that includes data stored within the range of addresses; and
   combining the portion of each execution result that includes data stored within the range into a single result.

4. The method of claim 1 further comprising predicting when the data stored within the range of addresses will be loaded into a target memory location.

5. The method of claim 4 further comprising:
identifying one or more operations that are dependent upon completion of the request to load data stored within the range of addresses; and
issuing, in dependence upon when the data stored within the range of addresses is predicted to be loaded into the target memory location, the one or more operations that are dependent upon completion of the request to load data stored within the range of addresses.

6. A multi-slice computer processor, the multi-slice computer processor configured for:
receiving a request to load data stored within a range of addresses, wherein the range of addresses includes a plurality of addresses each referencing physical memory in one of a plurality of distinct processor slices;
receiving, over a plurality of data communications busses, execution results from each distinct processor slice, wherein each of the plurality of data communications busses is associated with one of the distinct processor slices; and
formatting, by each processor slice, the execution results, including:
identifying a portion of the execution results that includes data contained in the range of addresses;
determining whether the portion of the execution results that includes data contained in the range of addresses represents a beginning portion of the range of addresses or an ending portion of the range of addresses; and
shifting, in dependence upon whether the portion of the execution results that includes data contained in the range of addresses represents a beginning portion of the range of addresses or an ending portion of the range of addresses, the portion of the execution results that includes data contained in the range of addresses.

7. The multi-slice computer processor of claim 6 further configured for assembling, from the execution results from each distinct processor slice, the data stored within the range of addresses.

8. The multi-slice computer processor of claim 7 wherein assembling, from the execution results from each distinct processor slice, the data stored within the range of addresses further comprises:
identifying a portion of each execution result that includes data stored within the range of addresses; and
combining the portion of each execution result that includes data stored within the range into a single result.

9. The multi-slice computer processor of claim 6 further configured for predicting when the data stored within the range of addresses will be loaded into a target memory location.

10. The multi-slice computer processor of claim 9 further configured for:
identifying one or more operations that are dependent upon completion of the request to load data stored within the range of addresses; and
issuing, in dependence upon when the data stored within the range of addresses is predicted to be loaded into the target memory location, the one or more operations that are dependent upon completion of the request to load data stored within the range of addresses.

11. A computing system, the computing system including a multi-slice computer processor, the multi-slice computer processor configured for:
receiving a request to load data stored within a range of addresses, wherein the range of addresses includes a plurality of addresses each referencing physical memory in one of a plurality of distinct processor slices;
receiving, over a plurality of data communications busses, execution results from each distinct processor slice, wherein each of the plurality of data communications busses is associated with one of the distinct processor slices; and
formatting, by each processor slice, the execution results, including:
identifying a portion of the execution results that includes data contained in the range of addresses;
determining whether the portion of the execution results that includes data contained in the range of addresses represents a beginning portion of the range of addresses or an ending portion of the range of addresses; and
shifting, in dependence upon whether the portion of the execution results that includes data contained in the range of addresses represents a beginning portion of the range of addresses or an ending portion of the range of addresses, the portion of the execution results that includes data contained in the range of addresses.

12. The computing system of claim 11, wherein the multi-slice computer processor is further configured for assembling, from the execution results from each distinct processor slice, the data stored within the range of addresses.

13. The computing system of claim 12, wherein assembling, from the execution results from each distinct processor slice, the data stored within the range of addresses further comprises:
identifying a portion of each execution result that includes data stored within the range of addresses; and
combining the portion of each execution result that includes data stored within the range into a single result.

14. The computing system of claim 11, wherein the multi-slice computer processor is further configured for:
predicting when the data stored within the range of addresses will be loaded into a target memory location;
identifying one or more operations that are dependent upon completion of the request to load data stored within the range of addresses; and
issuing, in dependence upon when the data stored within the range of addresses is predicted to be loaded into the target memory location, the one or more operations that are dependent upon completion of the request to load data stored within the range of addresses.

* * * * *